(12) United States Patent
Kuroyanagi et al.

(10) Patent No.: US 9,995,406 B2
(45) Date of Patent: Jun. 12, 2018

(54) VALVE DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Munetoshi Kuroyanagi, Nukata-gun (JP); Akio Nakamura, Okazaki (JP); Kazuo Haneda, Toyota (JP); Shusuke Inagi, Toyota (JP); Akira Yamashita, Toyota (JP); Masaaki Kondo, Owariasahi (JP)

(73) Assignees: JTEKT CORPORATION, Osaka (JP); TOYOTA JIDOSHA KABUSHIKI KAISHA, Toyota (JP)

(*) Notice: Subject to any disclaimer, the term of this patent is extended or adjusted under 35 U.S.C. 154(b) by 16 days.

(21) Appl. No.: 14/876,580

(22) Filed: Oct. 6, 2015

(65) Prior Publication Data
US 2016/0102771 A1   Apr. 14, 2016

(30) Foreign Application Priority Data

Oct. 8, 2014   (JP) .................................. 2014-207253

(51) Int. Cl.
*F16K 15/06* (2006.01)
*F16K 1/42* (2006.01)
(Continued)

(52) U.S. Cl.
CPC ............ *F16K 15/063* (2013.01); *F16K 1/422* (2013.01); *F16K 15/025* (2013.01);
(Continued)

(58) Field of Classification Search
CPC .............................. F16K 15/063; F16K 1/422
(Continued)

(56) References Cited

U.S. PATENT DOCUMENTS 1,363,623 A * 12/1920 Smith, Jr. ............... H01T 13/14
                                                        123/179.9
2,123,477 A    7/1938 Sheedy
(Continued)

FOREIGN PATENT DOCUMENTS

DE          1 236 291 B    3/1967
DE   10 2010 003 192 A1   9/2011
(Continued)

OTHER PUBLICATIONS

Feb. 26, 2016 Extended Search Report issued in European Patent Application No. 15188824.5.
(Continued)

*Primary Examiner* — Craig Schneider
*Assistant Examiner* — P. Macade Nichols
(74) *Attorney, Agent, or Firm* — Oliff PLC

(57) ABSTRACT

A valve device includes a body in which a gas flow passage is provided; and a check valve provided in the gas flow passage, the check valve including a poppet and a valve seat. The poppet excluding a block portion is in a form of a hollow shaft, the block portion being located at a distal end of the poppet and having a taper shape, and the poppet has at least one side hole that provides communication between an inside and an outside of a portion of the poppet, the portion being in the form of the hollow shaft. The at least one side hole extends obliquely with respect to a central axis line of the poppet such that the at least one side hole extends along a gas flow direction inclined with respect to a direction in which the poppet moves when the check valve opens.

3 Claims, 7 Drawing Sheets

(51) Int. Cl.
*F16K 15/02* (2006.01)
*F16K 47/02* (2006.01)
*F17C 13/04* (2006.01)

(52) U.S. Cl.
CPC ............ *F16K 47/023* (2013.01); *F17C 13/04* (2013.01); *F17C 2205/0335* (2013.01); *F17C 2205/0382* (2013.01); *F17C 2205/0394* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2270/0168* (2013.01); *F17C 2270/0184* (2013.01); *Y02E 60/321* (2013.01)

(58) Field of Classification Search
USPC ............. 137/538, 516.27, 540; 251/360, 361
See application file for complete search history.

(56) References Cited

U.S. PATENT DOCUMENTS

| | | | | |
|---|---|---|---|---|
| 2,234,932 | A * | 3/1941 | Schlaupitz | F02M 59/462 137/516.27 |
| 2,675,021 | A * | 4/1954 | Allin | F16K 15/063 137/516.29 |
| 2,930,401 | A * | 3/1960 | Cowan | F16K 15/025 137/540 |
| 3,099,999 | A * | 8/1963 | Vismara | F16K 15/026 137/515.5 |
| 3,770,009 | A * | 11/1973 | Miller | F16K 15/026 137/515.5 |
| 4,213,021 | A * | 7/1980 | Alexander | F16K 37/0033 137/540 |
| 4,287,912 | A * | 9/1981 | Hewett | F16K 15/044 137/516.27 |
| 5,893,389 | A * | 4/1999 | Cunningham | F16K 15/063 137/516.27 |
| 7,290,562 | B2 * | 11/2007 | Kane | F16K 15/026 137/538 |
| 8,069,876 | B2 * | 12/2011 | Kane | F16K 15/026 137/538 |
| 2004/0134539 | A1 * | 7/2004 | Ressel | F02M 63/0215 137/538 |
| 2006/0196553 | A1 * | 9/2006 | Kane | F16K 15/026 137/538 |
| 2009/0108225 | A1 * | 4/2009 | Kubo | F16K 1/36 251/324 |
| 2010/0206403 | A1 * | 8/2010 | Kuroyanagi | F16K 1/308 137/511 |
| 2015/0034195 | A1 * | 2/2015 | Shima | F16K 27/02 137/843 |
| 2015/0322743 | A1 * | 11/2015 | Thompson | E21B 33/038 166/75.11 |
| 2016/0102771 | A1 * | 4/2016 | Kuroyanagi | F17C 13/04 137/540 |
| 2016/0104903 | A1 * | 4/2016 | Nakamura | F16K 1/34 137/512.3 |
| 2016/0116918 | A1 * | 4/2016 | Nakamura | G05D 7/00 137/544 |

FOREIGN PATENT DOCUMENTS

| | | |
|---|---|---|
| EP | 2 833 037 A2 | 2/2015 |
| FR | 2 707 603 A1 | 1/1995 |
| GB | 502554 A | 3/1939 |
| JP | 2011-094641 A | 5/2011 |
| JP | 2013-029160 A | 2/2013 |
| JP | 2013-029161 A | 2/2013 |
| WO | 99/08028 A1 | 2/1999 |

OTHER PUBLICATIONS

Mar. 13, 2018 Office Action issued in Japanese Patent Application No. 2014-207253.

* cited by examiner

VALVE DEVICE

INCORPORATION BY REFERENCE

The disclosure of Japanese Patent Application No. 2014-207253 filed on Oct. 8, 2014 including the specification, drawings and abstract is incorporated herein by reference in its entirety.

BACKGROUND OF THE INVENTION

1. Field of the Invention

The invention relates to a valve device.

2. Description of Related Art

Conventionally, in a gas tank provided in a fuel cell vehicle or the like, a valve device is provided to control the supply of high-pressure hydrogen gas into the tank, and the discharge of the high-pressure hydrogen gas stored inside the tank. The valve device includes a body in which a gas flow passage is provided, the gas flow passage providing communication between the inside and the outside of the gas tank; and a valve mechanism that controls the flow of the hydrogen gas through the gas flow passage. The gas flow passage is connected to a pipe extending from an external device (for example a supply source that supplies the hydrogen gas) via a joint fitted to the body (for example, refer to Japanese Patent Application Publication No. 2013-29161 (JP 2013-29161A).

More specifically, as shown in FIG. 7, in a valve device described in JP 2013-29161A, a body 121 has an fitting hole 123 into which a joint 122 is fitted. The body 121 also has a supply passage 124 that is opened to the bottom surface of the fitting hole 123, and that serves as a gas flow passage through which hydrogen gas is supplied into a gas tank. The joint 122 is connected to a pipe 125 such that the pipe 125 is connected to the supply passage 124.

The supply passage 124 is provided with a check valve 132 that suppresses the discharge of the hydrogen gas to the outside through the fitting hole 123. The supply passage 124 includes an increased diameter portion 133 and a valve accommodation portion 134 that are provided in the fitting hole 123-side end portion of the supply passage 124. The increased diameter portion 133 is opened to the bottom surface of the fitting hole 123, and the valve accommodation portion 134 is adjacent to the increased diameter portion 133. The inside diameter of the valve accommodation portion 134 is smaller than the inside diameter of the increased diameter portion 133, and is larger than the inside diameter of the other portion of the supply passage 124. The check valve 132 includes a valve seat 136 in which a valve orifice 135 is provided at a center portion, a poppet 137 that makes contact with and separates from the valve seat 136 so as to close and open the valve orifice 135 (the supply passage 124), and an urging member 138 that urges the poppet 137 toward the valve seat 136.

When the hydrogen gas is not supplied to the gas tank, the poppet 137 is in close contact with the valve seat 136 and is constantly in a closed position due to the pressure of the hydrogen gas and the spring load of the urging member 138, and thus, the poppet 137 suppresses the discharge of the hydrogen gas through the supply passage 124.

When the hydrogen gas is supplied to the gas tank, the poppet 137 is pushed by the load caused by the hydrogen gas, and thus, the check valve 132 is opened. The hydrogen gas is supplied with the use of a pressure difference between the supply pressure and the tank inner pressure. When the pressure difference decreases, the gas flow rate decreases.

When the gas flow rate decreases, the load that pushes the poppet decreases, and as a result, balance between the load and the restoring force of the urging member may be lost. If the balance is lost, the poppet is subject to the fluctuation of the gas flow (that is, the poppet is likely to be influenced by the fluctuation of the gas flow), and as a result, chattering may be caused and thus noise may be caused.

SUMMARY OF THE INVENTION

The invention provides a valve device that makes it possible to suppress occurrence of noise caused by chattering of a poppet when a gas flow rate is low.

An aspect of the invention relates to a valve device configured to be fitted to a gas tank in which high-pressure gas is stored. The valve device includes a body in which a gas flow passage is provided, the gas flow passage providing communication between an inside and an outside of the gas tank; and a check valve provided in the gas flow passage, the check valve including a poppet that suppresses discharge of the gas inside the gas tank to an outside of the body, and a valve seat with which the poppet makes contact and from which the poppet separates. The poppet excluding a block portion is in a form of a hollow shaft, the block portion being located at a distal end of the poppet and having a taper shape, and the poppet has at least one side hole that provides communication between an inside and an outside of a portion of the poppet, the portion being in the form of the hollow shaft. The at least one side hole extends obliquely with respect to a central axis line of the poppet such that the at least one side hole extends along a gas flow direction inclined with respect to a direction in which the poppet moves when the check valve opens.

With the above-mentioned configuration, the at least one side hole extends obliquely with respect to the central axis line of the poppet such that the at least one side hole extends along the gas flow direction inclined with respect to the direction in which the poppet moves when the check valve opens. Therefore, even when the gas flow rate is low, the gas smoothly flows inside the poppet, and thus, the fluctuation of the gas flow is suppressed.

The valve device according to the above-mentioned aspect may further include a joint connecting a pipe to the gas flow passage; and a positioning member having a communication hole that communicates with the gas flow passage, wherein an outer surface of the body may have a fitting hole that leads to the gas flow passage; in the fitting hole, the joint and the positioning member may be arranged in a stated order from an outer side of the body; and the positioning member may be configured such that the positioning member is able to set a position of the valve seat even in a state where the joint is not fitted to the fitting hole.

With the above-mentioned configuration, the position of the valve seat in the gas flow passage is set by the positioning member. Therefore, even in the state where the joint is removed from the fitting hole, the position of the valve seat is not displaced, that is, the position of the valve seat is maintained. Accordingly, for example, when an operator accidentally removes the joint, the function of the check valve can be maintained.

According to the above-mentioned aspect of the invention, it is possible to suppress occurrence of noise caused by chattering of the poppet when the gas flow rate is low.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
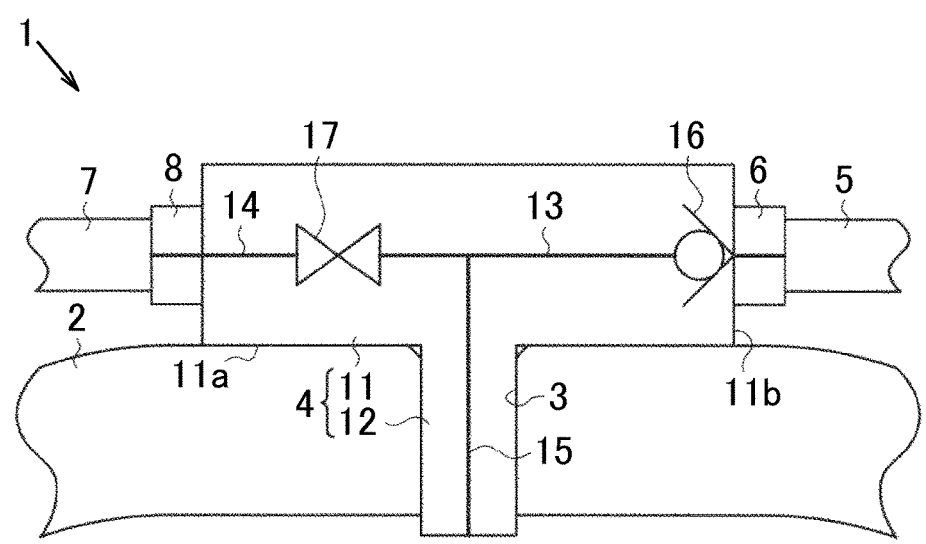
FIG. 1 is a view showing a schematic configuration of a valve device.

Hereinafter, a valve device according to a first embodiment will be described with reference to the drawings. A valve device 1 shown in FIG. 1 is fitted to a fitting opening 3 of a gas tank 2 in which hydrogen gas at a high pressure (for example, 70 MPa) is stored. The valve device 1 includes a body 4 (valve body) formed of aluminum alloy, a supply-side joint 6, and a delivery-side joint 8. The supply-side joint 6 serves as a joint that connects, to the valve device 1, a supply pipe (pipe) 5 extending from a supply source that supplies hydrogen gas. The delivery-side joint 8 connects, to the valve device 1, a delivery pipe 7 extending to a destination to which the hydrogen gas is delivered (i.e., a delivery destination), for example, a fuel cell. The body 4 includes a body portion 11 having a flat box shape, which is disposed outside the gas tank 2, and a fitting portion 12 that is inserted into the fitting opening 3. The fitting portion 12 has a circular columnar shape, and extends in a direction substantially orthogonal to a bottom surface 11a of the body portion 11 (i.e., in a downward direction in FIG. 1).

In the body portion 11, a supply passage 13 and a delivery passage 14 are provided. The supply passage 13 is provided to supply the hydrogen gas flowing from the supply pipe 5, into the gas tank 2. The delivery passage 14 is provided to deliver the hydrogen gas to the delivery destination such as a fuel cell via the delivery pipe 7. In the fitting portion 12, a connection passage 15 is provided. The connection passage 15 is connected to each of the supply passage 13 and the delivery passage 14, and is opened to the inside of the gas tank 2. That is, in the embodiment, the supply passage 13 and the connection passage 15 constitute a gas flow passage that provides communication between the inside and the outside of the gas tank 2. In the supply passage 13, a check valve 16 is provided. The check valve 16 suppresses the discharge (release) of the hydrogen gas, which has been supplied into the gas tank 2, to the outside of the body 4 (the outside of the valve device 1). In the delivery passage 14, a solenoid valve 17 is provided. The solenoid valve 17 controls the supply of the hydrogen gas to the delivery destination. In the valve device 1, the supply pipe 5 is connected to the supply-side joint 6 such that the supply pipe 5 is connected to the supply passage 13, and the delivery pipe 7 is connected to the delivery-side joint 8 such that the delivery pipe 7 is connected to the delivery passage 14.

Figure 2:
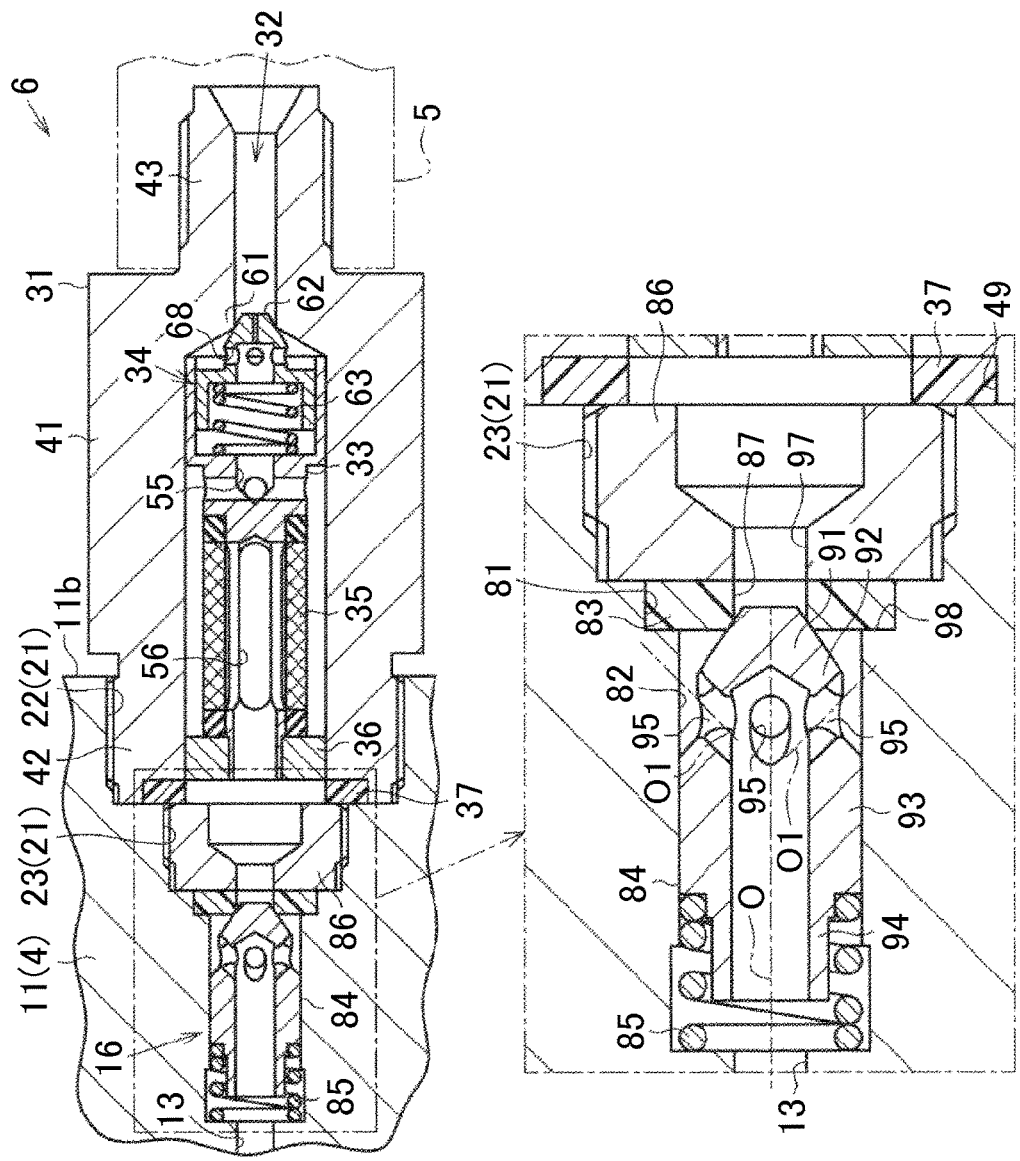
FIG. 2 is a partial sectional view showing connection portions of a body and a supply-side joint in a first embodiment of the invention.

Next, the configuration of connection portions of the body 4 and the supply-side joint 6 and the vicinity of the connection portions will be described. As shown in FIG. 2, a side surface 11b of the body portion 11, that is, the outer surface of the body portion 11 has a circular fitting hole 21 that extends in a direction substantially orthogonal to the side surface 11b (i.e., in a right-left direction in FIG. 2). The fitting hole 21 includes a first fitting hole 22 that is opened at the side surface 11b, and a second fitting hole 23 that is coaxial with, and adjacent to the first fitting hole 22. The inside diameter of the first fitting hole 22 is larger than the inside diameter of the second fitting hole 23. An internal thread (female thread) is provided on the inner peripheral surface of each of the first fitting hole 22 and the second fitting hole 23. The supply-side joint 6 is screwed to the first fitting hole 22, and thus, the supply-side joint 6 is fitted to the first fitting hole 22. A positioning member 86 (described later) is screwed to the second fitting hole 23, and thus, the positioning member 86 is fitted to the second fitting hole 23.

The supply passage 13 linearly extends such that the supply passage 13 is coaxial with the first fitting hole 22 and the second fitting hole 23 in the vicinity of the side surface 11b of the body portion 11. The supply passage 13 is opened to the bottom surface of the second fitting hole 23. Thus, the inside of the fitting hole 21 communicates with the supply passage 13. In the supply passage 13, the above-mentioned check valve 16 is provided.

The configuration of the supply-side joint 6 will be described in detail. The supply-side joint 6 includes a cylindrical joint body 31. In a through-hole 32 extending through the joint body 31 in the axial direction of the joint body 31, a support member 33, a throttle valve 34, a filter 35, a plug 36, and a seal member 37 are disposed. The through-hole 32 is formed such that the through-hole 32 is coaxial with the supply passage 13 in a state where the joint body 31 is fitted to the first fitting hole 22.

Figure 3:
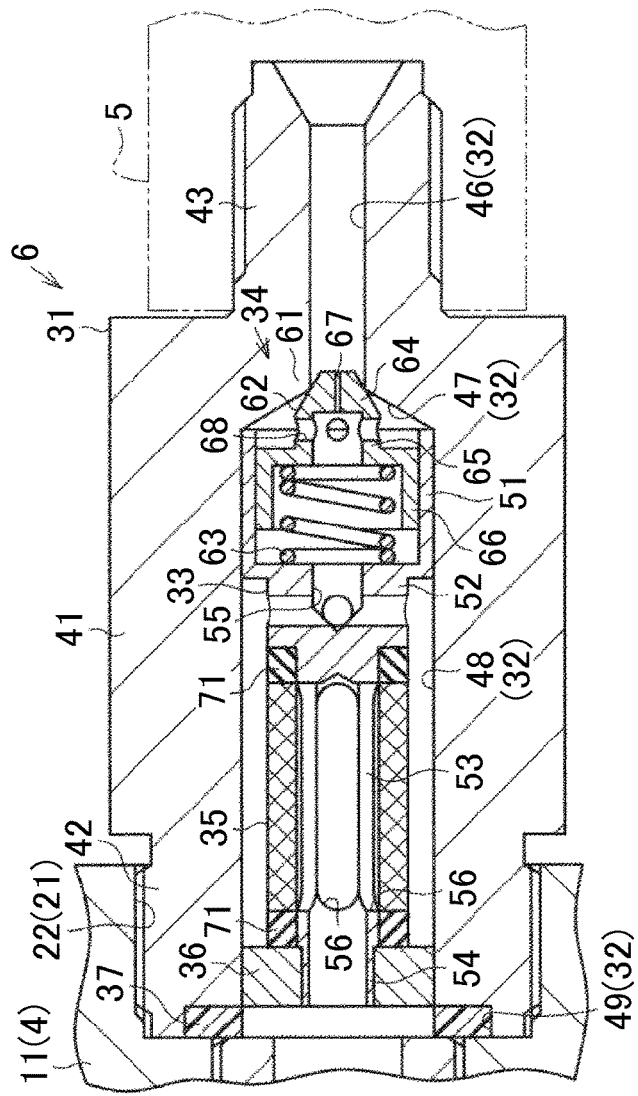
FIG. 3 is an enlarged sectional view showing the supply-side joint in the first embodiment.

More specifically, as shown in FIG. 3, the joint body 31 includes a grip portion 41 gripped (held) by a tool or the like, a body-side connection portion 42 extending from the grip portion 41 toward one end side (a left side in FIG. 3), and a pipe-side connection portion 43 extending from the grip portion 41 toward the other end side (a right side in FIG. 3). Parts of the outer peripheral surface of the grip portion 41 are chamfered such that the cross section of the grip portion 41 in a direction orthogonal to the axial direction has a hexagonal shape. An external thread (a male thread) that is screwed to the internal thread of the first fitting hole 22 is provided on the outer peripheral surface of the body-side connection portion 42. An external thread (a male thread) that is screwed to an internal thread provided on the inner peripheral surface of the supply pipe 5 is provided on the outer peripheral surface of the pipe-side connection portion 43. Thus, by screwing the body-side connection portion 42 to the first fitting hole 22, the joint body 31 is fitted such that the grip portion 41 and the pipe-side connection portion 43 protrude from the side surface 11b of the body portion 11.

The through-hole 32 provided in the joint body 31 includes a small-diameter hole portion 46, a taper hole portion 47, a large-diameter hole portion 48, and an increased-diameter hole portion 49 that are arranged in the stated order from the pipe-side connection portion 43-side (the right side in FIG. 3) toward the body-side connection portion 42-side. The small-diameter hole portion 46 extends from the end face of the pipe-side connection portion 43 to the grip portion 41, and the inside diameter of the small-diameter hole portion 46 is smaller than the inside diameter of each of the other portions of the through-hole 32.

The large-diameter hole portion 48 extends from the end face of the body-side connection portion 42 to a position in the grip portion 41, the position being close to the pipe-side connection portion 43. The inside diameter of the large-diameter hole portion 48 is larger than the inside diameter of the small-diameter hole portion 46, and is smaller than the inside diameter of the increased-diameter hole portion 49. The taper hole portion 47 is disposed between the large-diameter hole portion 48 and the small-diameter hole portion 46. The inside diameter of the taper hole portion 47 gradually increases in a direction from the small-diameter hole portion 46 toward the large-diameter hole portion 48. The inside diameter of the increased-diameter hole portion 49 is larger than the inside diameter of each of the other portions the through-hole 32. The increased-diameter hole portion 49 is opened at the end face of the body-side connection portion 42.

The support member 33 is disposed inside the large-diameter hole portion 48. The support member 33 includes a valve chamber forming portion 51, a columnar portion 52, a tubular portion 53, and a fitting portion 54 that are arranged in the stated order from the pipe-side connection portion 43-side (the right side in FIG. 3).

The valve chamber forming portion 51 has a bottomed-cylindrical shape, and is opened at the pipe-side connection portion 43-side (i.e., the pipe-side connection portion 43-side of the valve chamber forming portion 51 is opened). The outside diameter of the valve chamber forming portion 51 is substantially equal to the inside diameter of the large-diameter hole portion 48. The columnar portion 52 has a circular columnar shape. The outside diameter of the columnar portion 52 is smaller than the outside diameter of the valve chamber forming portion 51. In the columnar portion 52, a flow passage 55 is provided. The flow passage 55 extends through the columnar portion 52 in a radial direction of the columnar portion 52, and is opened to the bottom surface of the valve chamber forming portion 51. The tubular portion 53 has a cylindrical shape, and the outside diameter of the tubular portion 53 is smaller than the outside diameter of the columnar portion 52. In the tubular portion 53, a plurality of elongate holes 56 are provided. The elongate holes 56 extend through the tubular portion 53 from the inside of the tubular portion 53 to the outside of the tubular portion 53, and extend in the axial direction of the tubular portion 53. The fitting portion 54 has a cylindrical shape, and the outside diameter of the fitting portion 54 is slightly smaller than the outside diameter of the tubular portion 53.

The throttle valve 34 is disposed inside the valve chamber forming portion 51. The throttle valve 34 includes a throttle valve element 62 that makes contact with and separates from a throttle valve seat 61 that is a border portion between the small-diameter hole portion 46 and the taper hole portion 47, and an urging member 63 (for example, a coil spring) that urges the throttle valve element 62 toward the throttle valve seat 61. In the embodiment, the taper hole portion 47-side end (i.e., the taper hole portion 47-side opening) of the small-diameter hole portion 46 functions as a valve orifice of the throttle valve seat 61 (i.e., a throttle valve orifice).

The throttle valve element 62 includes a valve portion 64, a cylindrical portion 65, and an accommodation tube portion 66 that are arranged in the stated order from the throttle valve seat 61-side (the right side in FIG. 3). The valve portion 64 has a taper shape, that is, the outside diameter of the valve portion 64 decreases in a direction away from the cylindrical portion 65. The outside diameter of the largest portion of the valve portion 64 is smaller than the inside diameter of the large-diameter hole portion 48, and is larger than the inside diameter of the small-diameter hole portion 46. The outside diameter of the smallest portion (i.e., the portion having the smallest diameter) of the valve portion 64 is smaller than the inside diameter of the small-diameter hole portion 46. The valve portion 64 has a fine hole 67. The fine hole 67 is opened at a center of the distal end of the valve portion 64 and is opened to the inside of the cylindrical portion 65. The cylindrical portion 65 has a cylindrical shape, and the outside diameter of the cylindrical portion 65 is smaller than the inside diameter of the valve chamber forming portion 51. In the cylindrical portion 65, a plurality of side holes 68 are provided. The side holes 68 extend through the cylindrical portion 65 from the inside of the cylindrical portion 65 to the outside of the cylindrical portion 65. The side holes 68 communicate with the fine hole 67. The accommodation tube portion 66 has a cylindrical shape. The outside diameter of the accommodation tube portion 66 is substantially equal to the inside diameter of the valve chamber forming portion 51. The inside diameter of the accommodation tube portion 66 is larger than the outside diameter of the cylindrical portion 65. The urging member 63 in an axially compressed state is accommodated in the accommodation tube portion 66. More specifically, the urging member 63, which has been brought to the axially compressed state from a state where the length of the urging member 63 is a natural length and the force is not accumulated in the urging member 63, is accommodated in the accommodation tube portion 66. The throttle valve element 62 is urged toward the throttle valve seat 61 by the urging member 63.

As shown in FIG. 3, a filter 35 has a cylindrical shape, and is fitted to the outer periphery of the tubular portion 53. The inside diameter of the filter 35 is substantially equal to the outside diameter of the tubular portion 53 of the support member 33, and the outside diameter of the filter 35 is smaller than the inside diameter of the large-diameter hole portion 48. In the embodiment, the filter 35 is constituted by a metal mesh (a wire mesh). The filter 35 is disposed to face the elongate holes 56 of the tubular portion 53 in the radial direction in a state where annular gaskets 71 are disposed on respective sides of the filter 35 in the axial direction.

A plug 36 has an annular shape, and is fitted to the outer periphery of the fitting portion 54. The inside diameter of the plug 36 is substantially equal to the outside diameter of the fitting portion 54. The outside diameter of the plug 36 is substantially equal to the inside diameter of the large-diameter hole portion 48 of the through-hole 32. The plug 36 is disposed in a state where the plug 36 compresses the gaskets 71 provided on respective sides of the filter 35 in the axial direction.

The seal member 37 has an annular shape, and is fitted to the increased-diameter hole portion 49. The seal member 37 is formed of an elastic material such as polyimide resin. The seal member 37 is interposed (sandwiched) between the joint body 31 and the body portion 11 in the state where the joint body 31 (the supply-side joint 6) is fitted to the first fitting hole 22. Thus, the seal member 37 is in close contact with each of the joint body 31 and the body portion 11, and provides airtight sealing between the joint body 31 and the body portion 11 (the fitting hole 21).

Next, the configuration of the check valve will be described in detail. As shown in FIG. 2, the supply passage 13 includes an increased diameter portion 81 and a valve accommodation portion 82 that are provided in the fitting hole 21-side end portion of the supply passage 13. The increased diameter portion 81 is opened to the bottom surface of the second fitting hole 23. The valve accommodation portion 82 is adjacent to the increased diameter portion 81, and the check valve 16 is accommodated in the valve accommodation portion 82. The inside diameter of the valve accommodation portion 82 is smaller than the inside diameter of the increased diameter portion 81, and is larger than the inside diameter of the other portion of the supply passage 13, which is adjacent to the valve accommodation portion 82. The inner peripheral surface of the valve accommodation portion 82 is subjected to anodizing treatment.

The check valve 16 includes a check valve seat 83 that serves as a valve seat, a poppet 84 that makes contact with and separates from the check valve seat 83, and an urging member 85 (for example, a coil spring) that urges the poppet 84 toward the check valve seat 83. Further, the check valve 16 in the embodiment includes the positioning member 86 that sets the position of the check valve seat 83 in the supply passage 13, that is, the gas flow passage.

The check valve seat 83 is formed of an elastic material such as polyimide resin, and has an annular shape. The check valve seat 83 is fitted in the increased diameter portion 81. A check valve orifice 87 that extends through the check valve seat 83 in the axial direction is provided at a center of the check valve seat 83. The check valve orifice 87 is formed such that the check valve orifice 87 is disposed coaxially with the supply passage 13 in a state where the check valve seat 83 is fitted to the increased diameter portion 81.

The poppet 84 is formed of stainless steel. The poppet 84 includes a block portion 91, a small-diameter tube portion 92, a large-diameter tube portion 93, and a support portion 94 that are arranged in the stated order from the check valve seat 83-side (the right side in FIG. 2). The block portion 91 has a taper shape, that is, the outside diameter of the block portion 91 decreases in a direction away from the small-diameter tube portion 92. Each of the small-diameter tube portion 92, the large-diameter tube portion 93, and the support portion 94 has a cylindrical shape. The small-diameter tube portion 92, the large-diameter tube portion 93, and the support portion 94 constitute a hollow shaft. In other words, the portion of the poppet 84, which consists of the small-diameter tube portion 92, the large-diameter tube portion 93, and the support portion 94, is in the form of a hollow shaft. The outside diameter of the largest portion of the block portion 91 is smaller than the inside diameter of the valve accommodation portion 82, and is larger than the inside diameter of the check valve orifice 87 of the check valve seat 83. The outside diameter of the smallest portion of block portion 91 is smaller than the inside diameter of the check valve orifice 87. When the distal end of the block portion 91 is inserted in the check valve orifice 87 and thus the poppet 84 is seated at the check valve seat 83, the poppet 84 closes the check valve orifice 87. When the poppet 84 separates from the check valve seat 83, the poppet 84 opens the check valve orifice 87. That is, the poppet 84 closes and opens the supply passage 13 (the gas flow passage) by making contact with and separating from the check valve seat 83.

The outside diameter of the small-diameter tube portion 92 is smaller than the inside diameter of the valve accommodation portion 82. The small-diameter tube portion 92 has a plurality of side holes 95. The side holes 95 extend through the small-diameter tube portion 92 from the inside of the small-diameter tube portion 92 to the outside of the small-diameter tube portion 92. When the side holes 95 are formed, first, a hole extending in a direction orthogonal to a central axis line O of the poppet 84 is pierced (formed). Then, in a subsequent process, oblique holes are pierced such that the oblique holes extend in directions intersecting with the direction in which the above-mentioned hole extends and the oblique holes are inclined toward the block portion 91. That is, by performing this process, the side holes 95 are formed to extend obliquely with respect to the central axis line O of the poppet 84 such that the side holes 95 extend along gas flow directions inclined with respect to a direction in which the poppet 84 moves when the check valve 16 opens. More specifically, the side holes 95 extend along the gas flow directions (refer to arrows indicating the directions in which the hydrogen gas flows in FIG. 4) that are inclined toward the inside of the poppet 84 with respect to the direction in which the poppet 84 moves when the check valve 16 opens (i.e., a leftward direction in FIG. 4). In other words, the side holes 95 are inclined toward the inside of the poppet 84 with respect to the direction in which the poppet 84 moves when the check valve 16 opens (i.e., the leftward direction in FIG. 4). FIG. 2 shows central axis lines O1 of the oblique holes formed in the subsequent process.

In the subsequent processing, it is preferable that the oblique holes should be formed such that the central axis line O1 of each of the oblique holes intersects with the central axis line O. An intersection angle θ of the central axis line O1 of the oblique hole with respect to the central axis line O is, for example, 40° (40 degrees). However, the intersection angle θ is not limited to this value. The intersection angle θ may be in a range of 0°<θ<90° (the intersection angle θ may be larger than 0° and smaller than 90°). It is preferable that the intersection angle θ should be in a range of 20°≤θ≤60° (the intersection angle θ should be equal to or larger than 20° and equal to or smaller than 60°).

The outside diameter of the large-diameter tube portion 93 is formed to be substantially equal to the inside diameter of the valve accommodation portion 82 such that the large-diameter tube portion 93 is in sliding contact with the valve accommodation portion 82. The outside diameter of the support portion 94 is slightly smaller than the outside diameter of the large-diameter tube portion 93. One end of the urging member 85 is secured to the bottom surface of the valve accommodation portion 82, and the other end of the urging member 85 is secured to the end face of the large-diameter tube portion 93. Thus, the urging member 85 is fitted to the outer periphery of the support portion 94 of the poppet 84. The urging member 85 in an axially compressed state is accommodated together with the poppet 84 in the valve accommodation portion 82. More specifically, the urging member 85, which has been brought to the axially compressed state from a state where the length of the urging member 85 is a natural length and the force is not accumulated in the urging member 85, is accommodated together with the poppet 84 in the valve accommodation portion 82. Thus, the poppet 84 is urged toward the check valve seat 83 by the urging member 85.

As shown in FIG. 2, the positioning member 86 has an annular shape. An external thread (a male thread) is provided on the outer periphery of the positioning member 86. The external thread of the positioning member 86 is screwed to the internal thread of the second fitting hole 23. The positioning member 86 has a communication hole 97 that extends through the positioning member 86 in the axial direction. The communication hole 97 is disposed coaxially with the supply passage 13 in a state where the positioning member 86 is fitted to the second fitting hole 23. The supply passage 13 communicates with the through-hole 32 of the supply-side joint 6 (the joint body 31) via the communication hole 97. Thus, the supply-side joint 6 and the positioning member 86 are fitted to the fitting hole 21 (the first fitting hole 22 and the second fitting hole 23) such that the supply-side joint 6 and the positioning member 86 are coaxially arranged in the stated order from the outer side (i.e., the side surface 11b-side) of the body 4 (the body portion 11).

The length of the positioning member 86 in the axial direction is substantially equal to the depth of the second fitting hole 23 (i.e., the length of the second fitting hole 23 in the right-left direction in FIG. 2). Thus, the positioning member 86 does not protrude into first fitting hole 22 in a state where the positioning member 86 is fitted to the second fitting hole 23. That is, the positioning member 86 does not overlap with the supply-side joint 6 in the radial direction of the fitting hole 21. In other words, the axial position of the positioning member 86 does not overlap with the axial direction of the supply-side joint 6 in the axial direction (i.e., in the depth direction) of the fitting hole 21.

In the state where the positioning member 86 is fitted to the second fitting hole 23, the positioning member 86 presses the check valve seat 83 to a connecting surface 98 between the increased diameter portion 81 and the valve accommodation portion 82 (i.e., the connecting surface 98 connecting the inner peripheral surface of the increased diameter portion 81 and the inner peripheral surface of the valve accommodation portion 82 that have inside diameters different from each other), thereby setting (fixing) the position of the check valve seat 83 in the supply passage 13 (the gas flow passage). That is, the position of the check valve seat 83 in the supply passage 13 is set (fixed) by the positioning member 86 that is a member formed separately from the supply-side joint 6. Thus, even in a state where the supply-side joint 6 is not fitted to the fitting hole 21, the positioning member 86 is able to set the position of the check valve seat 83 in the supply passage 13. Further, the check valve seat 83 is interposed between the positioning member 86 and the body portion 11 (the valve accommodation portion 82). In other words, the check valve seat 83 is disposed in a region defined by the positioning member 86 and the body portion 11 (the increased diameter portion 81). Thus, the check valve seat 83 is in close contact with each of the body portion 11 and the positioning member 86, and the check valve seat 83 provides airtight sealing between the body portion 11 and the positioning member 86.

(Operation in the First Embodiment)

Next, the operation of the valve device according to the embodiment will be described. When hydrogen gas is supplied into the gas tank 2, the supply pipe 5 is connected to the supply-side joint 6 such that the hydrogen gas is delivered into the supply-side joint 6 as shown in FIG. 2. At this time, the throttle valve element 62 of the throttle valve 34 shown in FIG. 3 moves toward the body 4 against the urging force of the urging member 63, and thus, the throttle valve element 62 separates from the throttle valve seat 61. Thus, a large amount of hydrogen gas flows into the valve chamber forming portion 51 of the support member 33 via the small-diameter hole portion 46. The hydrogen gas, which has flowed into the valve chamber forming portion 51, flows into the supply passage 13, via the side holes 68 provided in the throttle valve element 62, the flow passage 55 provided in the columnar portion 52 of the support member 33, the filter 35, the elongate holes 56 provided in the tubular portion 53, and the communication hole 97 of the positioning member 86.

Figure 4:
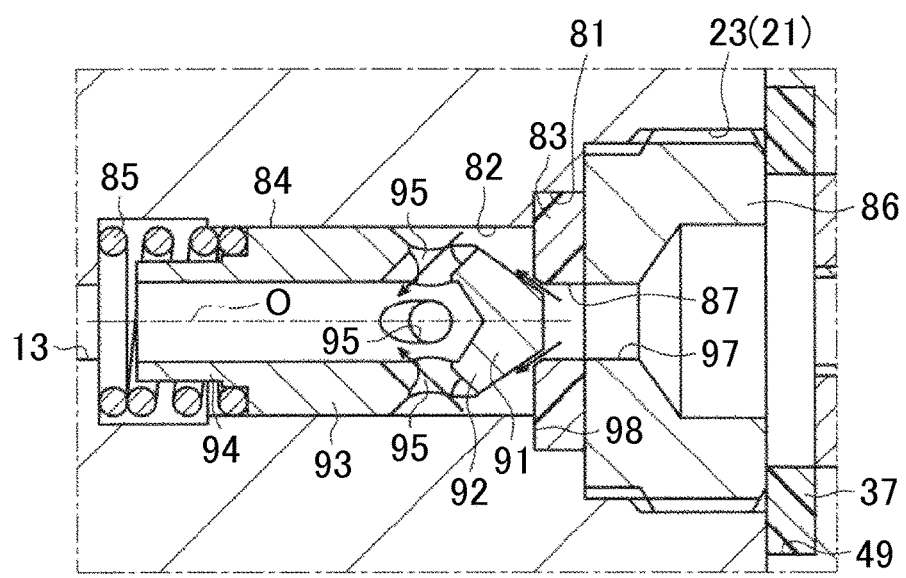
FIG. 4 is an enlarged sectional view showing an operation of a check valve.

Then, as shown in FIG. 4, due to the pressure of the hydrogen gas, the poppet 84 of the check valve 16 moves toward the inner side of the supply passage 13 against the urging force of the urging member 85, and thus, the poppet 84 separates from the check valve seat 83. In FIG. 4, the arrows indicate the directions in which the hydrogen gas flows, as described above.

Thus, the hydrogen gas flows into the valve accommodation portion 82, and flows into the poppet 84 through the side holes 95. The side holes 95 extend obliquely with respect to the central axis line O of the poppet 84 such that the side holes 95 extend along the gas flow directions inclined with respect to the direction in which the poppet 84 moves when the check valve 16 opens. Therefore, the flows of the gas introduced into the poppet 84 through the side holes 95 smoothly merge together. As a result, as compared to related art in which the central axis line of the side hole 95 is orthogonal to the central axis line O, the dynamic pressure drop (the dynamic pressure loss) in the poppet 84 is reduced, and the fluctuation of the gas flow in the poppet 84 is suppressed. The hydrogen gas, which has passed through the poppet 84, flows into the gas tank 2 via the supply passage 13 and the connection passage 15.

Even in the case where the gas flow rate decreases and thus the load pushing the poppet decreases, and the balance between the load and the restoring force of the urging member 85 is lost, the flows of the gas introduced into the poppet 84 through the side holes 95 smoothly merge together. Therefore, the fluctuation of the gas flow in the poppet 84 is suppressed, and as a result, chattering of the poppet 84 is suppressed.

When hydrogen gas is not supplied into the gas tank 2, the poppet 84 is urged toward the check valve seat 83 due to the pressure of the hydrogen gas in the gas tank 2 (the supply passage 13) and the urging force of the urging member 85, and thus, the poppet 84 is seated at the check valve seat 83. Thus, the check valve orifice 87 of the check valve seat 83 is closed, and the discharge (release) of the hydrogen gas from the gas tank 2 to the outside of the body 4 is suppressed. The throttle valve element 62 is seated at the throttle valve seat 61 due to the urging force of the urging member 63. As shown in FIG. 3, the throttle valve element 62 has the fine hole 67. Therefore, even in a state where the throttle valve element 62 is seated at the throttle valve seat 61, the flow of the hydrogen gas is not completely blocked. Thus, the throttle valve 34 functions as an excess flow stop valve that allows a small amount of hydrogen gas to flow from the large-diameter hole portion 48 to the small-diameter hole portion 46. Therefore, for example, when damage or the like occurs in the poppet 84 of the check valve 16, a small amount of hydrogen gas is discharged through the throttle valve 34, and thus, an operator can detect a failure in the valve device 1 (the check valve 16).

There may be a case where the operator accidentally removes the supply-side joint 6 (the joint body 31) from the fitting hole 21, for example, after hydrogen gas is supplied. Even in this case, the position of the check valve seat 83 is maintained, because the positioning member 86 remains screwed to the second fitting hole 23. Therefore, it is possible to suppress the occurrence of a situation where the poppet 84 cannot tightly close the check valve orifice 87, or the check valve seat 83 cannot remain in close contact with each of the body portion 11 and the positioning member 86 due to the displacement of the position of the check valve seat 83. Thus, the function of the check valve 16 is maintained.

There may be a case where a vehicle collision or the like occurs and a vehicle wheel or the like hits the outer peripheral surface of the supply-side joint 6 in a direction substantially orthogonal to the axial direction of the supply-side joint 6. In this case, due to the impact caused by the collision with the vehicle wheel or the like, for example, the supply-side joint 6 may be deformed, and may be inclined in the first fitting hole 22. In this regard, in the valve device 1 according to the embodiment, the axial position of the supply-side joint 6 and the axial position of the positioning member 86 do not overlap with each other in the axial direction of the fitting hole 21. Therefore, when the supply-side joint 6 is inclined due to an impact, the supply-side joint 6 is unlikely to interfere with the positioning member 86. Further, in the valve device 1 according to the embodiment, the inside diameter of the second fitting hole 23 is smaller than the inside diameter of the first fitting hole 22 as described above, and there is a step (in other words, a level difference) between the inner peripheral surface of the first fitting hole 22 and the inner peripheral surface of the second fitting hole 23. Therefore, even when the first fitting hole 22 is deformed due to the impact, the deformation of the first fitting hole 22 is unlikely to influence the second fitting hole 23. Accordingly, even when a large impact is applied to the supply-side joint 6, the displacement of the position of the positioning member 86 in the second fitting hole 23 is suppressed.

Next, the effects of the embodiment will be described. (1) The valve device 1 according to the embodiment includes the body 4 and the check valve 16. In the body 4, the supply passage 13 and the connection passage 15 are provided (i.e., the gas flow passage is provided), the supply passage 13 and the connection passage 15 providing communication between the inside and the outside of the gas tank 2. The check valve 16 includes the poppet 84 that suppresses the discharge of the gas inside the gas tank 2 to the outside of the body 4, and the check valve seat 83.

The poppet 84 excluding the block portion 91 is in the form of a hollow shaft, the block portion 91 being located at the distal end of the poppet 84 and having a taper shape. The poppet 84 has the side holes 95 that provide communication between the inside and the outside of the portion of the poppet 84, the portion being in the form of the hollow shaft. Further, the side holes 95 extend obliquely with respect to the central axis line O of the poppet 84 such that the side holes 95 extend along the gas flow directions inclined with respect to the direction in which the poppet 84 moves when the check valve 16 opens. As a result, it is possible to suppress the occurrence of noise due to chattering of the poppet when the gas flow rate is low.

(2) In the valve device 1 according to the embodiment, the outer surface of the body 4 has the fitting hole 21 that leads to the supply passage 13 (the gas flow passage). In the fitting hole 21, the supply-side joint 6 and the positioning member 86 are arranged and fitted in the stated order from the outer side of the body 4. The supply-side joint 6 connects the pipe to the supply passage 13 (the gas flow passage). The positioning member 86 has the communication hole 97 that communicates with the supply passage 13 (the gas flow passage). The positioning member 86 is configured such that the positioning member 86 is able to set the position of the check valve seat 83 even in the state where the supply-side joint 6 is not fitted to the fitting hole 21. Therefore, for example, when the operator accidentally removes the supply-side joint 6, the position of the check valve seat 83 is maintained, and the function of the check valve 16 can be maintained.

(3) The axial position of the supply-side joint 6 and the axial position of the positioning member 86 do not overlap with each other in the axial direction of the fitting hole 21. Therefore, when a large impact is applied to the supply-side joint 6, it is possible to suppress the displacement of the position of the positioning member 86 in the fitting hole 21 caused by the interference with the supply-side joint 6. Thus, it is possible to appropriately maintain the position of the check valve seat 83.

(4) The fitting hole 21 includes the first fitting hole 22 and the second fitting hole 23 having the inside diameter smaller than the inside diameter of the first fitting hole 22. Therefore, when a large impact is applied to the supply-side joint 6, it is possible to suppress the displacement of the position of the positioning member 86 in the second fitting hole 23 caused by the deformation of the first fitting hole 22. Thus, it is possible to more appropriately maintain the position of the check valve seat 83.

Second Embodiment

Next, a valve device according to a second embodiment will be described with reference to FIG. 5. For the sake of illustration, the portions that are the same or correspond to those in the first embodiment will be denoted by the same reference numerals, and the descriptions thereof will be omitted.

Figure 5:
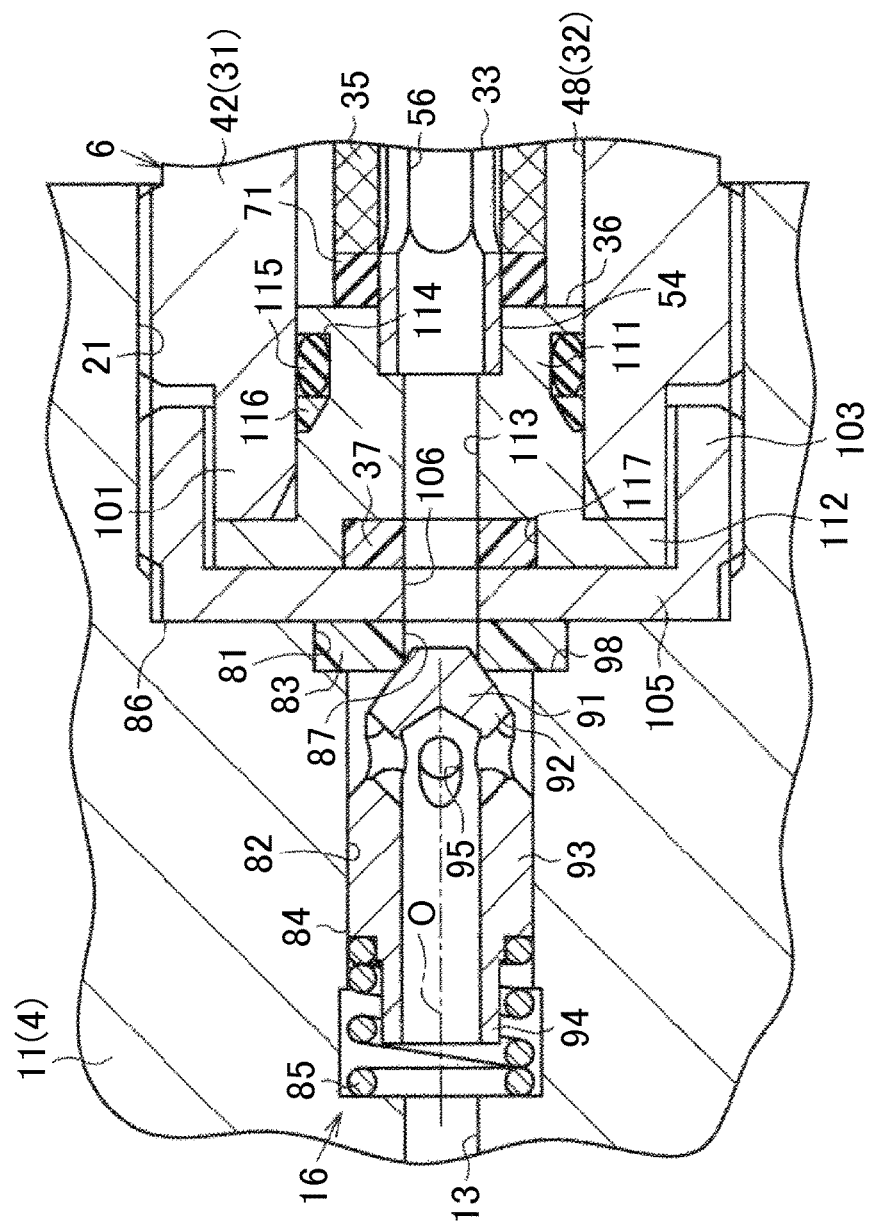
FIG. 5 is a partial sectional view showing connection portions of a body and a supply-side joint in a second embodiment of the invention.

As shown in FIG. 5, the inside diameter of the fitting hole 21 is substantially constant over the entire fitting hole 21 in the axial direction (i.e., in the depth direction) of the fitting hole 21. An internal thread (a female thread) is provided on the inner peripheral surface of the fitting hole 21. The joint body 31 of the supply-side joint 6 and the positioning member 86 are screwed to the internal thread, and thus, the joint body 31 and the positioning member 86 are fitted to the fitting hole 21. The joint body 31 includes a cylindrical extending portion 101 that further extends from the body-side connection portion 42. The outside diameter of the extending portion 101 is smaller than the outside diameter of the body-side connection portion 42. The through-hole 32 of the joint body 31 does not include the increased-diameter hole portion 49 in the above-mentioned first embodiment.

The positioning member 86 includes a tube portion 103 having a bottomed cylindrical shape. An external thread (a male thread) provided on the outer periphery of the tube portion 103 is screwed to the internal thread of the fitting hole 21. The inside diameter of the tube portion 103 is substantially equal to the outside diameter of extending portion 101 of the joint body 31. The extending portion 101 is inserted in the tube portion 103. That is, the positioning member 86 in the embodiment overlaps with the supply-side joint 6 in the radial direction of the fitting hole 21. In other words, the axial position of the positioning member 86 and the axial position of the supply-side joint 6 overlap with each other in the axial direction of the fitting hole 21. In a bottom portion 105 of the positioning member 86, a communication hole 106 is provided. The communication hole 106 extends through the bottom portion 105 in the axial direction of the positioning member 86. The communication hole 106 is formed such that the communication hole 106 is disposed coaxially with the supply passage 13 in the state where the positioning member 86 is fitted to the fitting hole 21.

The plug 36 includes an insertion portion 111, and a flange portion 112 that is provided on a side of the insertion portion 111, the side being close to the positioning member 86. An axial hole 113 that extends through the plug 36 in the axial direction of the plug 36 is provided at a center of the plug 36. The outside diameter of the insertion portion 111 is substantially equal to the inside diameter of the large-diameter hole portion 48 of the joint body 31. An annular groove 114 that extends in the circumferential direction of the insertion portion 111 is provided on the outer peripheral surface of the insertion portion 111. An O-ring 115 and a backup ring 116 are fitted to the annular groove 114. Thus, airtight sealing is provided between the plug 36 and the joint body 31. The outside diameter of the flange portion 112 is substantially equal to the inside diameter of the tube portion 103 of the positioning member 86. The flange portion 112 faces the extending portion 101 of the joint body 31 in the axial direction. An increased diameter hole portion 117 is provided in the flange portion 112-side end portion (i.e., the left end portion in FIG. 5) of the axial hole 113. The inside diameter of the increased diameter hole portion 117 is larger than the inside diameter of the other portion of the axial hole 113.

The seal member 37 is fitted in the increased diameter hole portion 117. In a state in which the joint body 31 is fitted to the fitting hole 21, the extending portion 101 presses the flange portion 112 such that the seal member 37 is interposed (sandwiched) between the plug 36 and the positioning member 86. Thus, the seal member 37 is in close contact with each of the plug 36 and the positioning member 86, and thus, airtight sealing is provided between the positioning member 86 and the plug 36.

According to the second embodiment, it is possible to obtain the effect of the first embodiment described in the above-mentioned section (1). Each of the above-mentioned embodiments may be appropriately modified. Modified examples of each of the above-mentioned embodiments will be described below.

In each of the above-mentioned embodiments, the side holes 95 of the poppet 84 are formed by piercing (forming) the hole extending in the direction orthogonal to the central axis line O of the poppet 84, and then, piercing (forming) the oblique holes extending in the directions intersecting with the direction in which the above-mentioned hole extends, in the small-diameter tube portion 92 of the poppet 84.

The side holes 95 may be formed by forming the oblique holes whose central axis lines O1 obliquely intersect with the central axis line O of the poppet 84, in the small-diameter tube portion 92 of the poppet 84, instead of forming the hole extending in the direction orthogonal to the central axis line O and then forming the oblique holes. That is, the formation of the hole extending in the direction orthogonal to the central axis line O may be omitted. Further, the number of the side holes 95 is not particularly limited. That is, the number of the side holes (oblique holes) 95 may be one, or two or more.

In the first embodiment, the fitting hole 21 includes the first fitting hole 22 and the second fitting hole 23 that have the inside diameters different from each other. However, the invention is not limited to this configuration. The inside diameter of the fitting hole 21 may be substantially constant over the entire fitting hole 21 in the depth direction (the axial direction) of the fitting hole 21.

Figure 6:
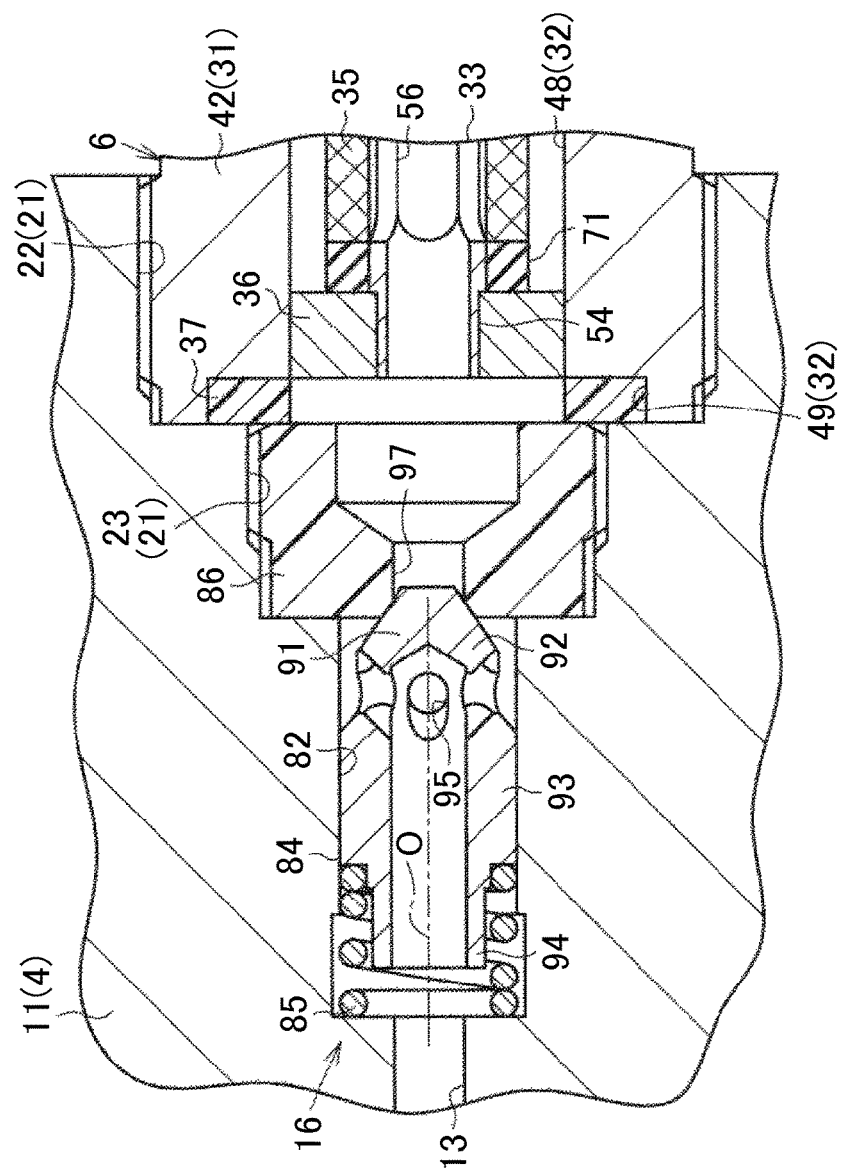
FIG. 6 is a partial sectional view showing connection portions of a body and a supply-side joint in another example.
Figure 7:
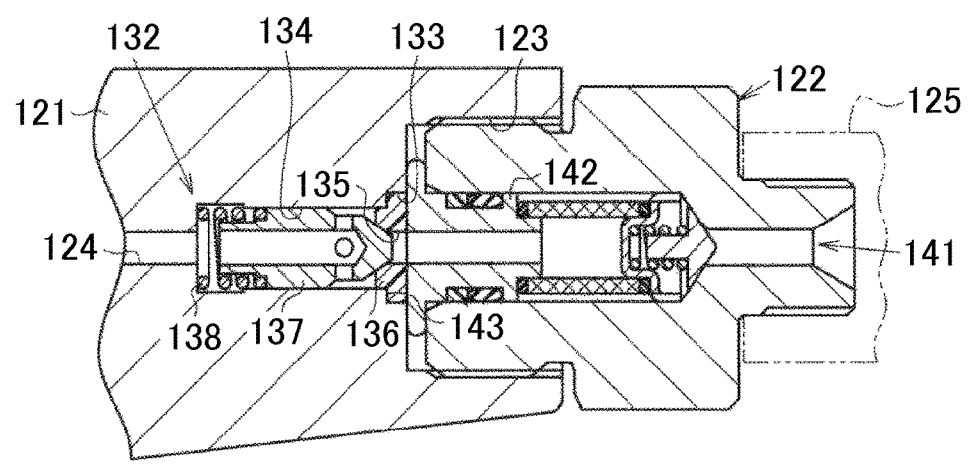
FIG. 7 is a partial sectional view showing connection portions of a body and a supply-side joint in related art.

In the first embodiment, the check valve 16 includes the annular check valve seat 83 that is a member formed separately from the positioning member 86. However, the invention is not limited to this configuration. For example, as shown in FIG. 6, the positioning member 86 may be formed of an elastic material such as polyimide resin, and the poppet 84 may close and open the communication hole 97 of the positioning member 86 (i.e., the check valve orifice) by making contact with and separating from the positioning member 86. That is, the positioning member 86 may function also as the check valve seat. Similarly, in the second embodiment, the positioning member 86 may function also as the check valve seat.

In the example shown in FIG. 6, the positioning member 86 may be formed of soft metal that is elastically deformable, for example, brass or copper alloy. In each of the above-mentioned embodiments, each of the check valve seat 83 and the seal member 37 may be formed of soft metal.

In each of the above-mentioned embodiments, the joint body 31 and the positioning member 86 are screwed to the fitting hole 21 (the first fitting hole 22 and the second fitting hole 23). However, the invention is not limited to this configuration. For example, the joint body 31 and the positioning member 86 may be press-fitted into the fitting hole 21.

In each of the above-mentioned embodiments, the throttle valve 34 may not be provided in the supply-side joint 6. In each of the above-mentioned embodiments, the coil spring is used as each of the urging members 63 and 85. However, the invention is not limited to this configuration. For example, a disc spring or an elastic body may be used as each of the urging members 63 and 85. In the case where the poppet 84 can be urged toward the check valve seat 83 by the pressure of hydrogen gas, the urging member 85 may not be provided, and in the case where the throttle valve element 62 can be urged toward the throttle valve seat 61 by the pressure of hydrogen gas, the urging member 63 may not be provided.

In each of the above-mentioned embodiments, the valve device 1 is fitted to the gas tank 2 in which hydrogen gas is stored. However, the invention is not limited to this configuration. The valve device 1 may be fitted to a gas tank in which gas other than hydrogen gas is stored.

What is claimed is:

1. A valve device configured to be fitted to a gas tank in which high-pressure gas is stored, the valve device comprising:
   a body in which a gas flow passage and a fitting hole are provided, the fitting hole provided on an outer surface of the body, and the gas flow passage providing communication between an inside and an outside of the gas tank through the fitting hole;
   a check valve provided in the gas flow passage, the check valve including a poppet that suppresses discharge of the gas inside the gas tank to an outside of the body, and a valve seat with which the poppet makes contact and from which the poppet separates,
   a joint at least partially located in the fitting hole and configured to connect a pipe to the gas flow passage; and
   a positioning member configured with a communication hole that communicates with the gas flow passage, the positioning member being arranged between the joint and the gas flow passage such that the positioning member is located in the fitting hole, the positioning member configured to set a position of the valve seat even in a state where the joint is not fitted in the fitting hole;
   wherein:
   the poppet excluding a block portion is in a form of a hollow shaft, the block portion being located at a distal end of the poppet and having a taper shape, and the poppet has at least one side hole that provides communication between an inside and an outside of a portion of the poppet, the portion being in the form of the hollow shaft; and
   the at least one side hole extends obliquely with respect to a central axis line of the poppet such that the at least one side hole extends along a gas flow direction inclined with respect to a direction in which the poppet moves when the check valve opens.

2. The valve device according to claim 1, wherein
an intersection angle of a central axis line of each of the at least one side hole with respect to the central axis line of the poppet is 20°, or 60°, or between 20° and 60°.

3. The valve device according to claim 1, wherein:
the gas flow passage includes an increased diameter portion in which the valve seat is fitted, and a valve accommodation portion in which the poppet is accommodated;
an inside diameter of the valve accommodation portion is smaller than an inside diameter of the increased diameter portion; and
the positioning member sets the position of the valve seat by pressing the valve seat to a connecting surface that connects an inner peripheral surface of the increased diameter portion and an inner peripheral surface of the valve accommodation portion.

* * * * *